US008136131B2

(12) United States Patent
Aoki et al.

(10) Patent No.: US 8,136,131 B2
(45) Date of Patent: Mar. 13, 2012

(54) OPTICAL PICKUP AND PRODUCTION METHOD THEREOF

(75) Inventors: Takao Aoki, Yokohama (JP); Masaki Murayama, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 379 days.

(21) Appl. No.: 12/456,773

(22) Filed: Jun. 23, 2009

(65) Prior Publication Data
US 2009/0323504 A1 Dec. 31, 2009

(30) Foreign Application Priority Data

Jun. 30, 2008 (JP) ................................. 2008-170659

(51) Int. Cl.
*G11B 7/09* (2006.01)
(52) U.S. Cl. ...................................... 720/681
(58) Field of Classification Search .................... 720/681
See application file for complete search history.

(56) References Cited

U.S. PATENT DOCUMENTS

| 6,625,105 B2* | 9/2003 | Suzuki et al. ................ 720/681 |
| 6,845,510 B2* | 1/2005 | Yoshinaga .................... 720/681 |
| 7,327,644 B2* | 2/2008 | Ohkuma ..................... 369/44.32 |
| 7,461,390 B2* | 12/2008 | Usami et al. .................. 720/681 |
| 7,464,389 B2* | 12/2008 | Song et al. .................... 720/681 |
| 7,484,229 B2* | 1/2009 | Miyagi ......................... 720/683 |

FOREIGN PATENT DOCUMENTS

| JP | 2000-293873 | 10/2000 |
| JP | 2001-023207 | 1/2001 |
| JP | 2004-355755 | 12/2004 |
| JP | 2005-018864 | 1/2005 |

* cited by examiner

*Primary Examiner* — Mark Blouin
(74) *Attorney, Agent, or Firm* — Renner, Kenner, Greive, Bobak, Taylor & Weber (57) ABSTRACT

An optical pickup includes an actuator having an objective lens and an optical base on which the actuator is supported. The actuator includes a yoke having an opening, a first straight section and an opposing second straight section, the opening being interposed between the straight sections, the first and second straight sections having a first and a second bent section, respectively, as an extension of each bent section. The yoke is formed as coving the actuator with the straight sections so that the objective lens is exposed through the opening without being obstructed by the optical base. The first bent section has one contact section whereas the second bent section has two contact sections. The optical base includes an ark-like support section. The optical base supports the actuator in such a way that the contact sections are made to have contact with the ark-like support section.

13 Claims, 12 Drawing Sheets

OPTICAL PICKUP AND PRODUCTION METHOD THEREOF

CROSS-REFERENCE TO RELATED APPLICATIONS

This application is based on and claims the benefit of priority from the prior Japanese Patent Application No. 2008-170659 filed on Jun. 30, 2008, the entire contents of which is incorporated herein by reference.

BACKGROUND OF THE INVENTION

The present invention relates to an optical pickup for use in recording on and/or reproduction from optical discs, such as CD (Compact Disc) and DVD (Digital Versatile Disc) and a method of producing such an optical pickup. Particularly, this invention relates to an optical pickup equipped with a skew adjustment mechanism and a method of producing such an optical pickup.

An optical pickup, installed in optical disc apparatuses and reciprocally movable in the radial direction of an optical disc, is mainly constituted by an optical base and an actuator mounted on the optical base.

The actuator is constituted by an actuator base, a movable unit movably supported by the actuator base through suspension wires, and an objective lens attached to the movable unit.

An assembly procedure for such an optical pickup usually includes radial- and tangential-skew adjustments for the attitude (optical axis) of the objective lens to the optical base. Practically, the skew adjustments adjust the attitude of the actuator base to the optical base in tangential and radial directions, which is disclosed, for example, in Japanese Unexamined Patent Publication (JUPP) No. 2000-293873.

An improved skew adjustment mechanism is disclosed, for example, in JUPP No. 2001-23207. The skew adjustment mechanism is provided with a yoke base, a portion of which is bent in an optical base side as an abutting piece. The abutting piece is made to have contact with an opening peripheral edge of a concavity of the optical base for smooth skew adjustments.

In known optical pickups, a yoke base is provided between an optical base and a movable unit, or a yoke is provided at the optical base side with respect to the movable unit, which makes the movable unit to be exposed to an optical disc side in an optical disc apparatus.

Such a structure requires a protective cover to protect the movable unit by covering the most part of the movable unit against adverse effects of dust and foreign bodies, and against damages during the shipment of optical pickups. An optical pickup with such a protective cover is disclosed, for example, in JUPP No. 2005-18864.

Also, in the skew adjustment mechanism disclosed in JUPP No. 2001-23207, the yoke base is provided between the optical base and the movable unit. The movable unit is then inevitably exposed to an optical disc side in an optical disc apparatus, thus requiring such a protective cover.

Nevertheless, an optical pickup equipped with such a protective cover does not meet strong demands for higher cost performance, which require an optical pickup having a movable unit protectable without such a protective cover, equipped with a skew adjustment mechanism with a smaller number of components and a smaller number of adjustment processes, and a method of producing such an optical pickup.

SUMMARY OF THE INVENTION

A purpose of the present invention is to provide an optical pickup having a movable unit protectable without a particular protective cover, equipped with a skew adjustment mechanism with a smaller number of components and a smaller number of adjustment processes, and a method of producing such an optical pickup with a smaller number of assembly processes.

The present invention provides an optical pickup comprising: an actuator having an objective lens; and an optical base on which the actuator is supported, wherein the actuator includes a yoke having an opening, a first straight section and an opposing second straight section, the opening being interposed between the first and second straight sections, the first and second straight sections having a first bent section and a second bent section, respectively, as an extension of each bent section, the yoke being formed as coving the actuator with the first and second straight sections so that the objective lens is exposed through the opening without being obstructed by the optical base, the first bent section having a first contact section, the second bent section having a second contact section and a third contact section, and the optical base includes an ark-like support section to support the actuator, whereby the optical base supports the actuator in such a way that the first contact section of the first bent section and the second and third contact sections of the second bent section are made to have contact with the ark-like support section.

Moreover, the present invention provides a method of producing an optical pickup including an optical base and an actuator having an actuator base, a movable unit, and a yoke, the movable unit having an objective lens and being supported by the actuator base as movable with respect to the actuator base, the method comprising the steps of: forming the yoke as having a pair of opposing first and second straight sections with a first and a second bent section, respectively, as an extension thereof; fixing the yoke on the actuator base so that the first and second straight sections cover the movable unit except for the objective lens; mounting the actuator on the optical base so that the objective lens is exposed between the first and second straight sections without being obstructed by the optical base and so that the first and second bent sections only have contact with the optical base in order for the actuator to take an attitude with respect to the optical base; pushing each straight section with at least one adjustment pin; and adjusting a force to push the adjustment pin or a tip position of the adjustment pin to change the attitude of the actuator with respect to the optical base, thus adjusting an inclination of an optical axis of the optical lens to the optical base.

DETAILED DESCRIPTION OF PREFERRED EMBODIMENT

A preferred embodiment of an optical pickup according to the present invention will be described with reference to the attached drawings.

Throughout the drawings, elements or components that are not important in the description with respect to each drawing are omitted from the drawing for brevity and clarity. Thus, there are some elements or components depicted in different shapes in the drawings.

Figure 1:
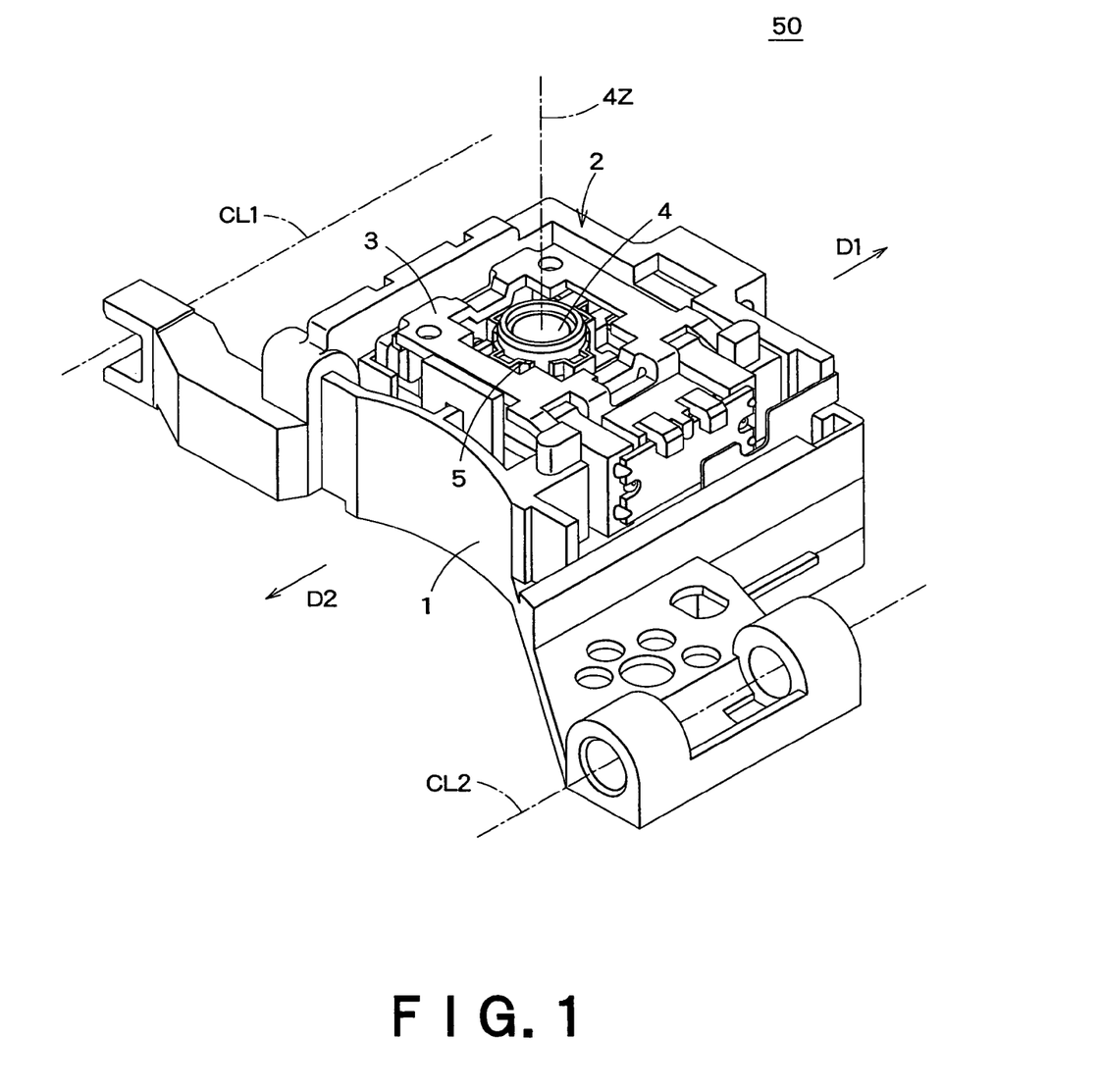
FIG. 1 shows a perspective view of an embodiment of an optical pickup according to the present invention.

FIG. 1 shows a perspective view of an embodiment of an optical pickup according to the present invention. The embodiment is also shown in three views in FIG. 2 in which (a), (b), and (c) are a plan view, a front view, and a right side view, respectively.

Figure 2:
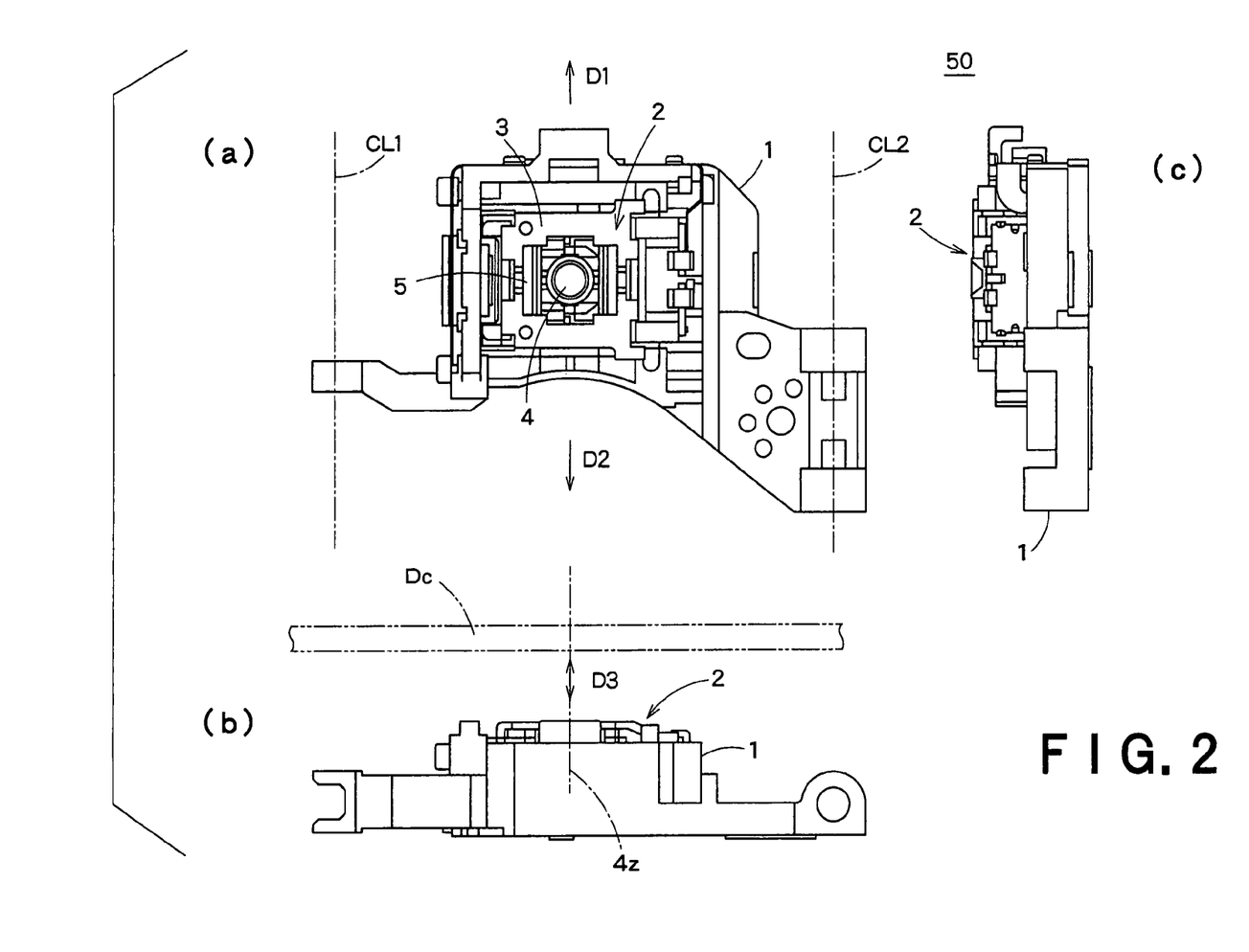
FIG. 2 shows the embodiment of the optical pickup according to the present invention, in three views in which (a), (b), and (c) are a plan view, a front view, and a right side view, respectively.

An optical pickup 50 shown in FIGS. 1 and 2 is mainly constituted by an optical base 1 and an actuator 2 mounted on the optical base 1. The optical pickup 50 can be used for optical apparatuses, such as optical disc apparatuses.

The optical base 1 is mounted on an optical disc apparatus (not shown) in such a way that: it is supported by guide shafts (also not shown) of the optical disc apparatus, provided along parallel axes CL1 and CL2; and it is reciprocally movable along the guide shafts by a drive means (also not shown) in directions D1 and D2 which are the radial directions of an optical disc Dc.

The actuator 2 is mainly constituted by a yoke 3, an objective lens 4, and a lens holder 5 that holds the objective lens 4.

The objective lens 4 is movable with respect to the optical base 1 while held by the lens holder 5 in a focusing direction in which the lens 4 moves closer to or apart from the optical disc Dc and a tracking direction, the radial directions D1 and D2 of the disc Dc, through suspension wires (not shown).

Figure 3:
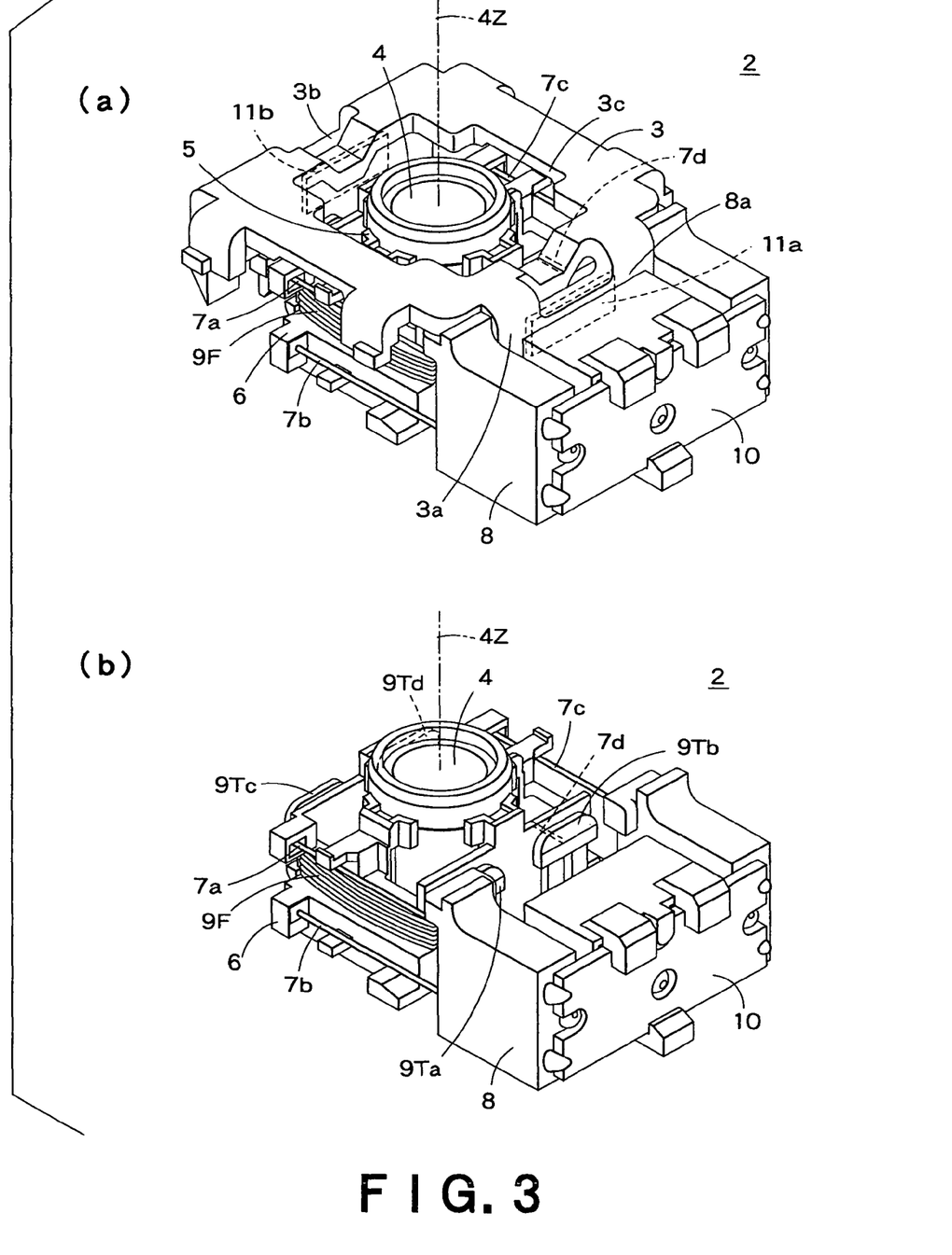
FIG. 3 shows perspective views of the embodiment of the optical pickup according to the present invention, (a) and (b) showing an actuator with and without a yoke, respectively.

The actuator 2 is described in detail with respect to (a) of FIG. 3 and also (b) of FIG. 3, which shows the actuator 2 without the yoke 3.

The actuator 2 is constituted by: the yoke 3; the objective lens 4; the lens holder 5 that holds the objective lens 4; and also a bobbin 6 integral with the holder 5; four suspension wires 7a, 7b, 7c, and 7d fixed to the bobbin 6 at an end of each wire; and an actuator base 8, to which the wires 7a to 7d are fixed at the other end of each wire, that holds and actuates the bobbin 6 to move, thorough the wires 7a to 7d.

The yoke 3 is made of a thin steel plate, having bent sections 3a and 3b in opposite ends. The actuator base 8 is provided with an envelope-like engaging section 8a. The yoke 3 is engaged with the actuator base 8 while the bent section 3a is inserted into the envelope-like engaging section 8a by indentation.

Magnets 11a and 11b are fixed, with an adhesive, to the inner surfaces of the bent sections 3a and 3b, respectively, constituting a magnetic circuit with the yoke.

A focusing coil 9F is wound around the bobbin 6. Provided on both sides of the bobbin 6 are tracking coils 9Ta, 9Tb, 9Tc, and 9Td. In detail, the coils 9Ta and 9Tb are provided on the actuator base 8 side whereas the coils 9Tc and 9Td are provided on the opposite side so that the objective lens 4 is interposed therebetween.

The focusing coil 9F and the tracking coils 9Ta to 9Td are arranged so that they are located in magnetic fields generated by the magnets 11a and 11b. Moreover, the focusing coil 9F and the tracking coils 9Ta to 9Td are electrically connected, through the suspensions wires 7a to 7d, to an actuator drive circuit (not shown) provided on a printed circuit board 10 attached to the actuator base 8.

The focusing coil 9F and the tracking coils 9Ta to 9Td are excited under control by a focusing and tracking controller (not shown) provided to an optical disc apparatus (not shown).

The objective lens 4 and the bobbin 6 integral with the lens holder 5 that holds the lens 4 are driven in the focusing and tracking directions when information is recorded on or reproduced from the optical disc Dc.

Figure 4:
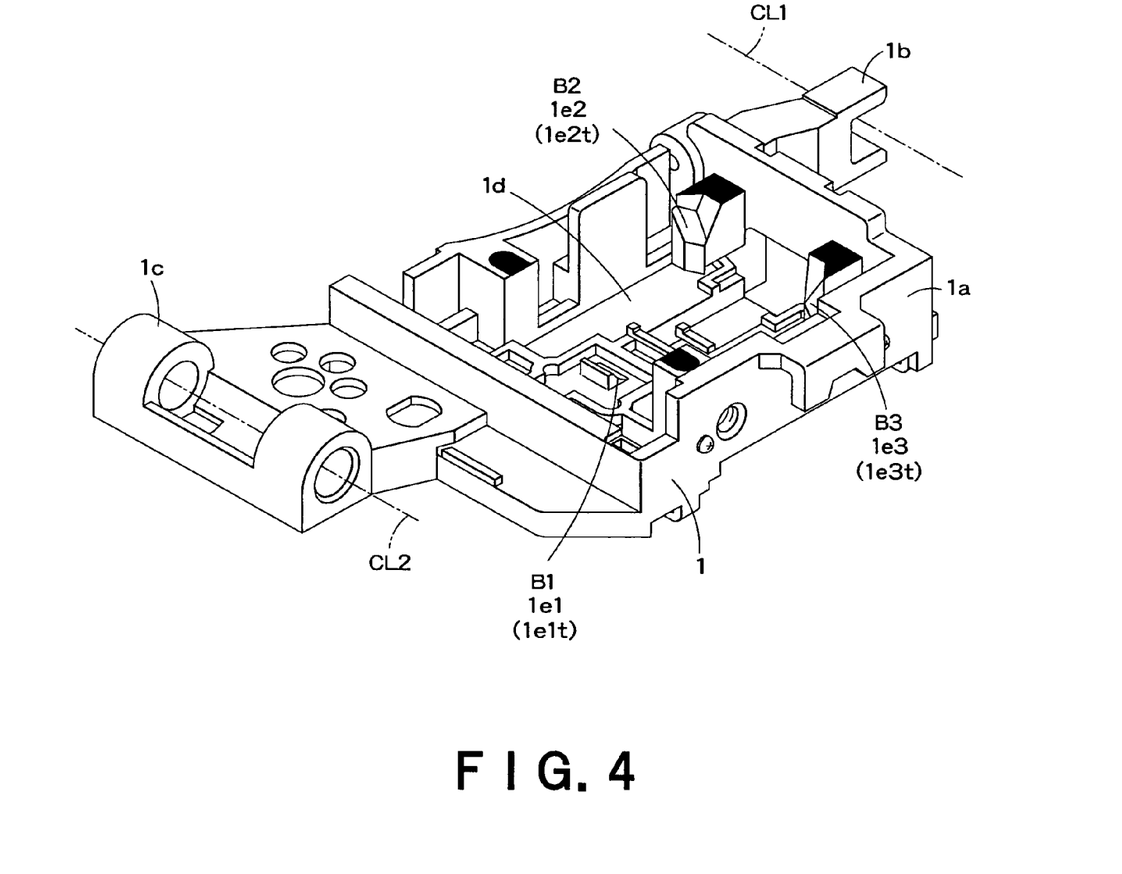
FIG. 4 shows a perspective view of an optical base in the embodiment of the optical pickup according to the present invention.
Figure 5:
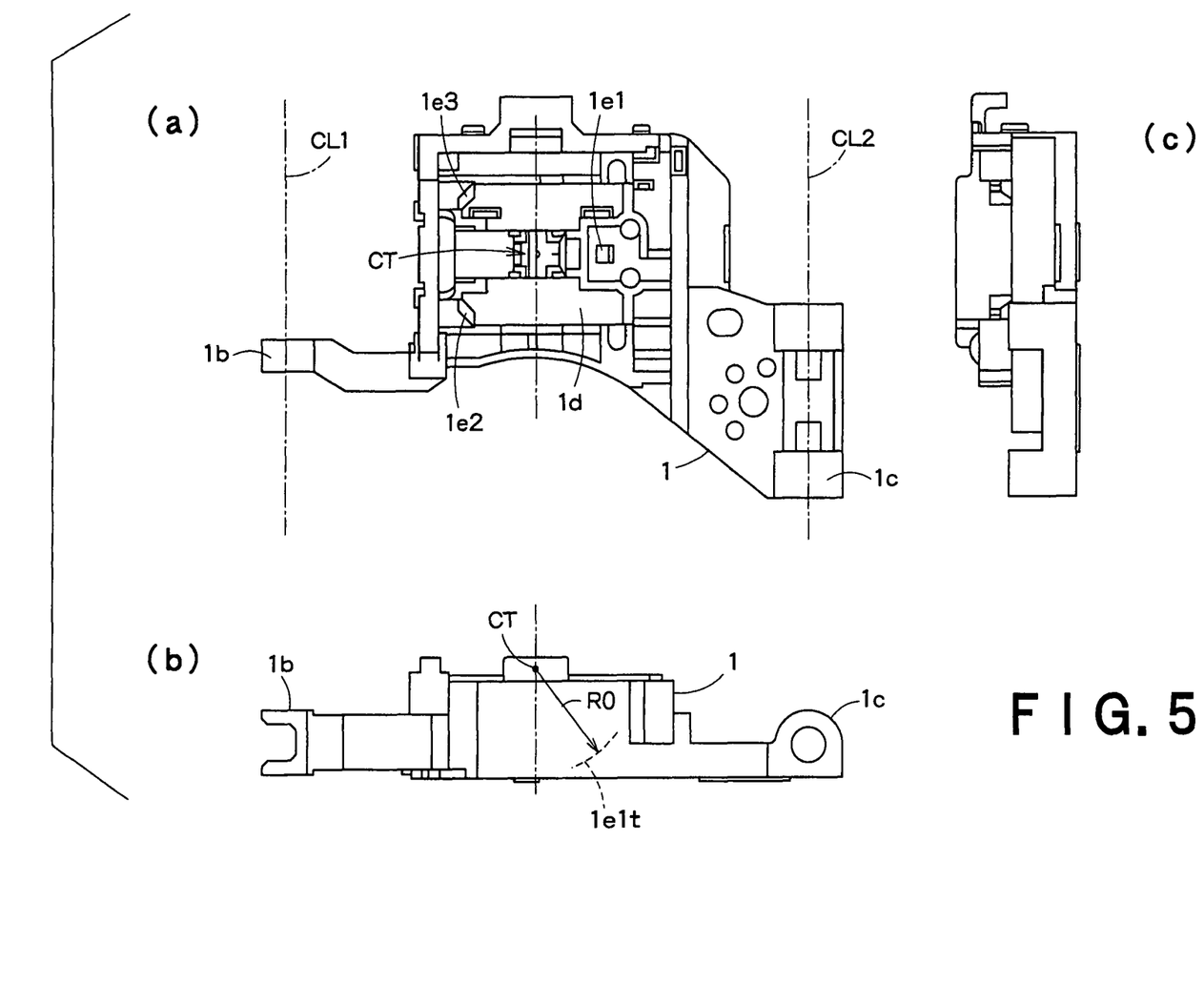
FIG. 5 shows the optical base in the embodiment of the optical pickup according to the present invention, with three views in which (a), (b), and (c) are a plan view, a front view, and a right side view, respectively.

The optical base 1 is described in detail with respect to FIG. 4, a perspective view, and also FIG. 5, with three views in which (a), (b), and (c) are a plan view, a front view, and a right side view, respectively.

The optical base 1 can be produced by resin injection molding or die casting.

The optical base 1 is provided with a bottom plate section 1d and a box-like base section 1a having an opening in the top side with respect to the bottom plate section 1d. Moreover, the optical base 1 is provided with arms 1b and 1c supported by guide shafts of an optical disc apparatus (not shown).

The bottom plate section 1d is provided with three protrusions 1e1, 1e2, and 1e3 that stick out from the bottom section 1d towards the top side. The protrusions 1e1, 1e2, and 1e3 have surface sections 1e1t, 1e2t, and 1e3t, respectively, included in (or part of) a spherical surface having a radius R0 from a center CT. Illustrated (b) of FIG. 5 is the location of the surface section 1e1t of the protrusion 1e1, the same being applied to the surface sections 1e2t, and 1e3t. The center CT is the principal point of the objective lens 4. The surface sections 1e1t, 1e2t, and 1e3t may be provided at the top side of the protrusions 1e1, 1e2, and 1e3, respectively.

Hereinafter, the surface sections 1e1t, 1e2t, and 1e3t, shown in FIGS. 4 and 5, are referred to as base sliding sections B1, B2, and B3, respectively.

Figure 6:
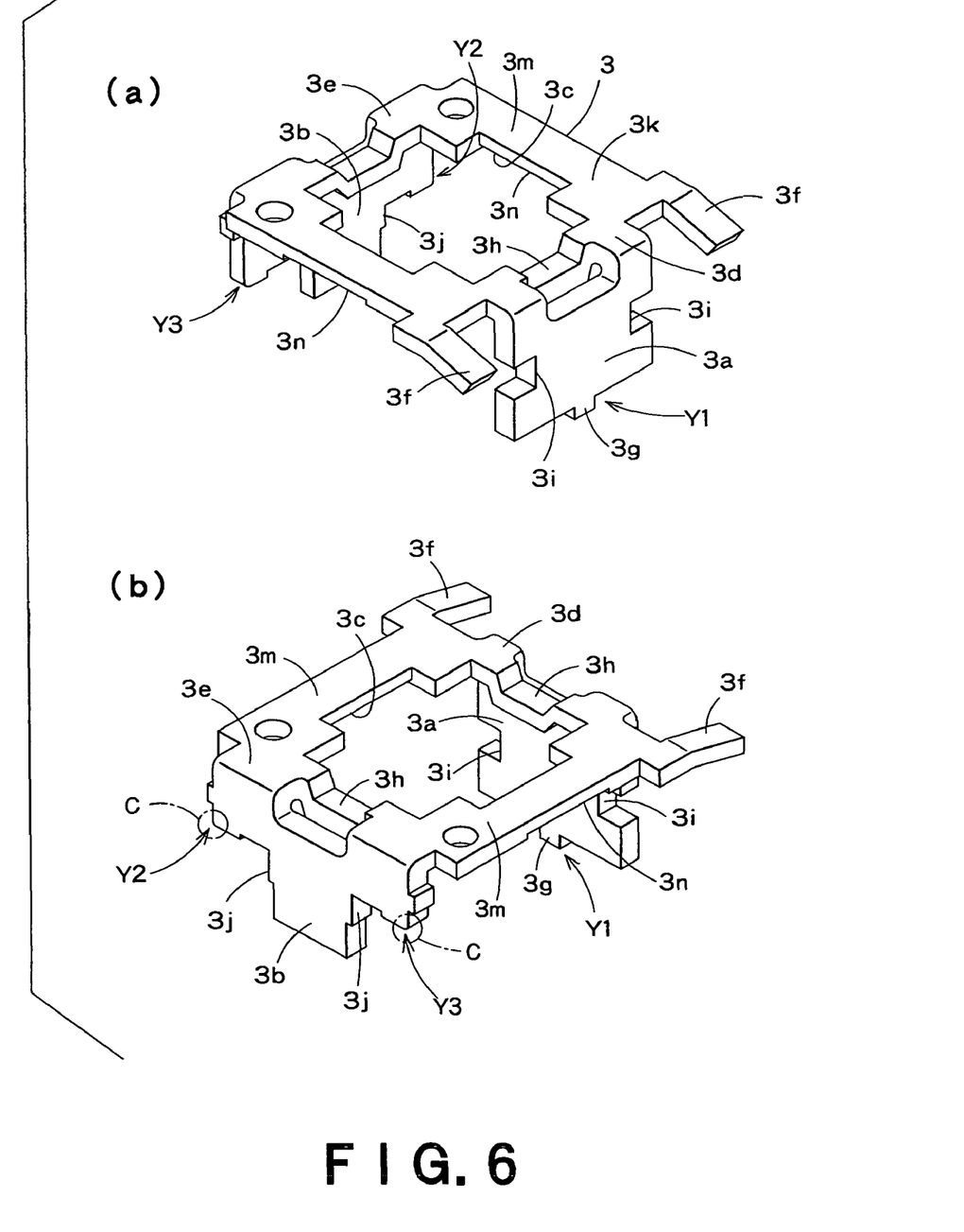
FIG. 6 shows the yoke in the embodiment of the optical pickup according to the present invention, with perspective views (a) and (b) at different angles.
Figure 7:
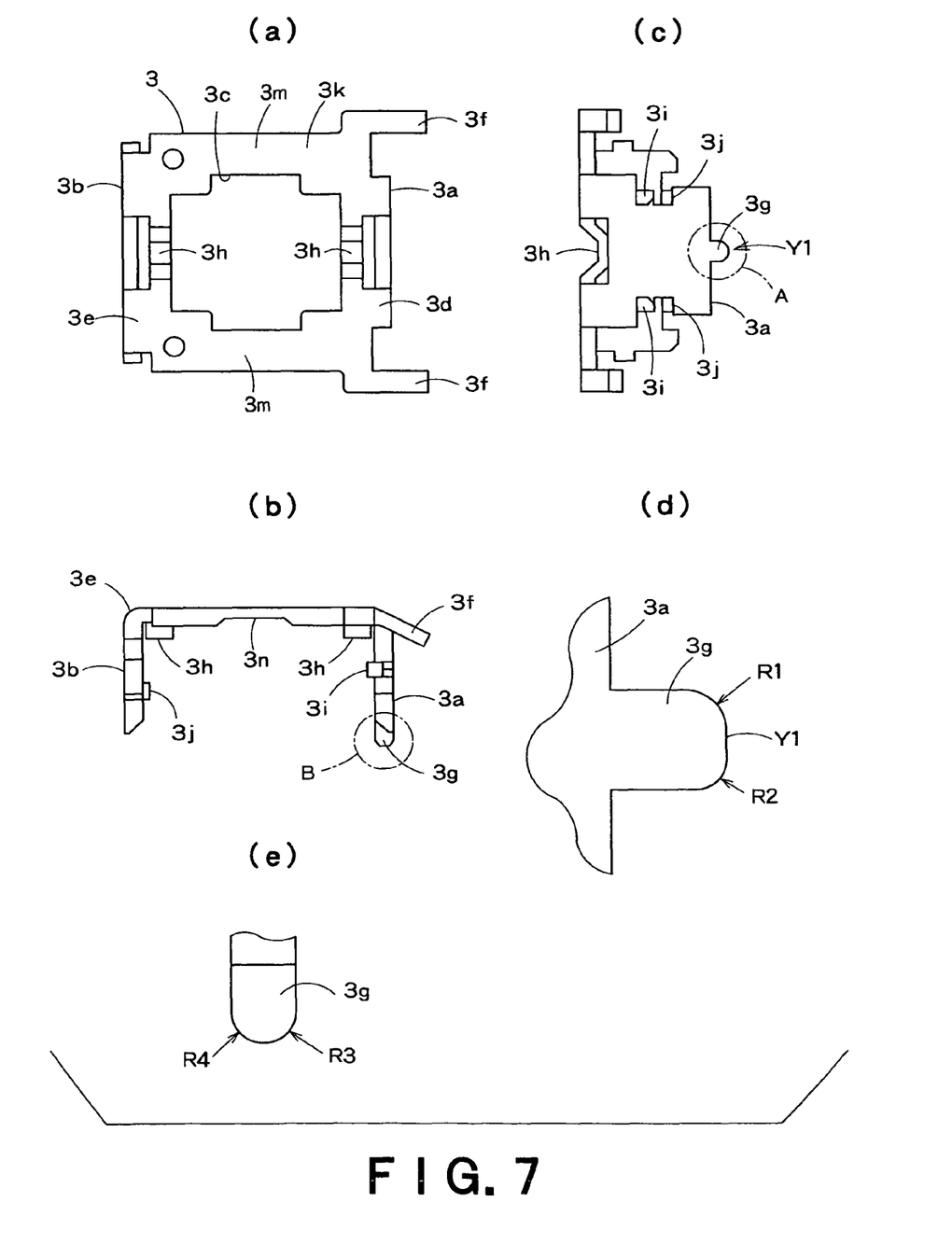
FIG. 7 shows the yoke in the embodiment of the optical pickup according to the present invention, with three views in which (a), (b), and (c) are a plan view, a front view, and a right side view, respectively, with (d) an enlarged view of a zone A in (c), and (e) an enlarged view of a zone B in (b)

Next, the yoke 3 is described in detail with respect to FIG. 6 with perspective views (a) and (b) at different angles, and also FIG. 7 with three views in which (a), (b), and (c) are a plan view, a front view, and a right side view, respectively, with (d) an enlarged view of a zone A in (c), and (e) an enlarged view of a zone B in (b).

The yoke 3 is produced by press forming of a thin iron plate, with a thickness of 0.8 mm, for example.

The yoke 3 is provided with: a frame-like base section 3k having an opening 3c, opposing frame sections 3d and 3e, and opposing frame sections 3m; and bent sections 3a and 3b attached to the frame sections 3d and 3e, respectively, and bent in the same direction at about 90 degrees.

Formed on both ends of the frame section 3d are protrusions 3f that stick out from the frame section 3d as inclined towards the direction in which the bent section 3a is bent. The protrusions 3f are not shown in (a) of FIG. 3 because they are not important elements of the yoke 3 in (a) of FIG. 3, as the elements of the actuator 2, and which could otherwise make (a) of FIG. 3 complicated if depicted.

Formed further to the frame section 3d and also the frame section 3e are protrusions 3h that stick out from the frame sections 3d and 3e in the direction in which the bent sections 3a and 3b are bent.

The bent sections 3a and 3b have protrusions 3i and 3j, respectively, each sticking out inwards from the corresponding bent section.

With the protrusions 3h, 3i, and 3j, the magnets 11a and 11b are positioned at a specific location on the inner surfaces of the bent sections 3a and 3b, respectively, as shown in FIG. 3.

Provided on the back of the frame sections 3m with no bent sections formed are thin inner sections 3n that are formed as thinner than the other sections. The thin inner sections 3n are provided in a specific location for the bobbin 6 so as not to collide with the base section 3k when the actuator 2 is driving in the focus and/or tracking directions.

The bent section 3a has a protrusion 3g almost at the center of its end portion. The protrusion 3g has curved corners R1 and R2, as shown (d) of FIG. 7 that is an enlarged view of the zone A in (c) of FIG. 7. Moreover, the protrusion 3g has curved corners R3 and R4, as shown (e) of FIG. 7 that is an enlarged view of the zone B in (b) of FIG. 7.

The curved corners R1 to R4 are formed by press working to the respective corners of the protrusion 3g when the yoke 2 is produced. It is preferable to form at least the inner corners R1a and R2, and also the outer corner R3 of the protrusion 3g as having a curved surface, as shown in (d) and (e) of FIG. 7. It is also preferable that each curved section has a spherical surface.

Figure 8:
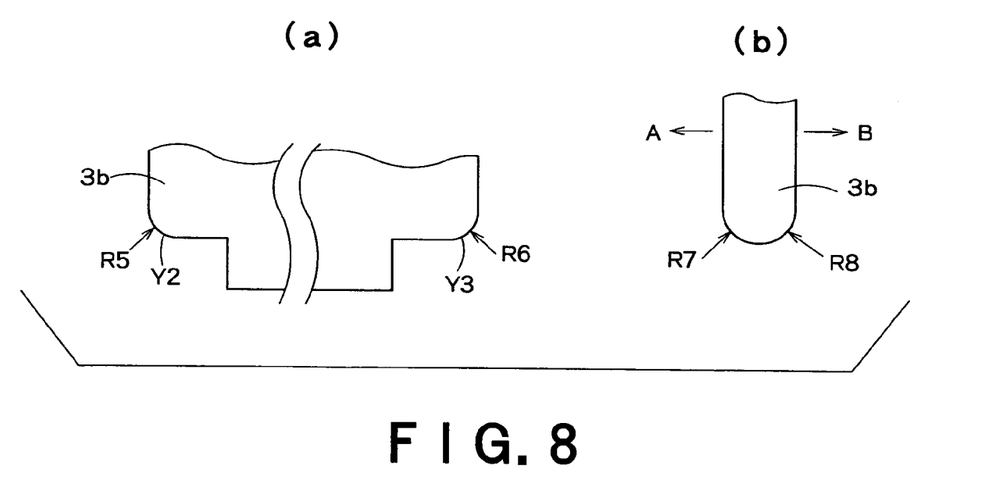
FIG. 8 shows a bent section in the embodiment of the optical pickup according to the present invention, with partially enlarged views (a) and (b) for a zone C in (b) of FIG. 6.

The bent section 3b is described with respect to FIG. 8 that shows enlarged views of zones C in (b) of FIG. 6. Shown in (a) and (b) of FIG. 8 are the outer and inner sides, respectively, of the bent section 3b. In detail, (a) of FIG. 8 is an enlarged fragmentary plan view of the zones C in (b) of FIG. 6 when viewed from the left side in (b) of FIG. 6, and (b) of FIG. 8 is an enlarged side view of each zone C, in relation to (a) of FIG. 8. Arrows A and B shown in (b) of FIG. 8 indicate the outside and the inside, respectively, of the bent section 3b in (b) of FIG. 6.

As shown in (a) of FIG. 8, the bent section 3b has curved corners R5 and R6 in the zones C in (b) of FIG. 6, and also curved corners R7 and R8 in each zone C. The curved corners R5 to R8 are formed by press working to the respective corners when the yoke 2 is produced. It is preferable to form at least the outer corners R5 and R6, and also the curved corner R7 located in the outside in relation to the curved corner R8, as having a curved surface. It is further preferable that the curved corners R7 and R8 are formed as being smoothly curved like an arc, as shown in (b) of FIG. 8.

Hereinafter, the curved corners R1 to R4 of the protrusion 3g shown in FIG. 7 are referred to as a yoke sliding section Y1 that is shown in (c) and (d) of FIG. 7. Moreover, the curved corners R5 and R6 of the bent section 3b are referred to as yoke sliding sections Y2 and Y3 that are shown in (a) of FIG. 8.

The yoke sliding sections Y1 to Y3 are arranged as having contact with the base sliding sections B1 to B3 (surface sections 1e1t, 1e2t, and 1e3t, respectively, shown in FIGS. 4 and 5), respectively, which will be discussed with respect to FIGS. 9 and 10.

Figure 9A:
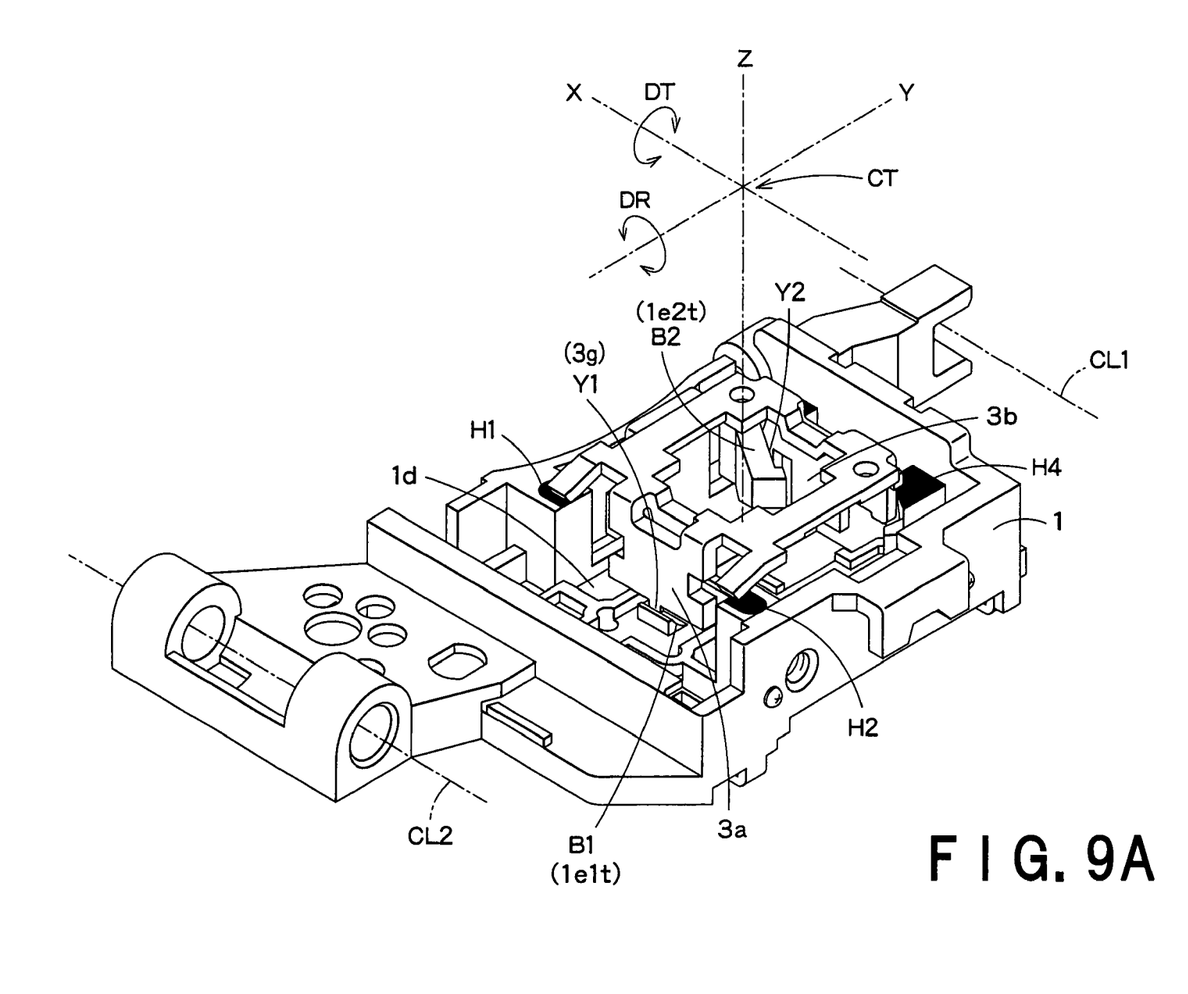
FIG. 9A shows a perspective view of the optical base and the yoke at different angles when the actuator (not shown in FIG. 9A) is mounted on the optical base, in the embodiment of the optical pickup according to the present invention.
Figure 9B:
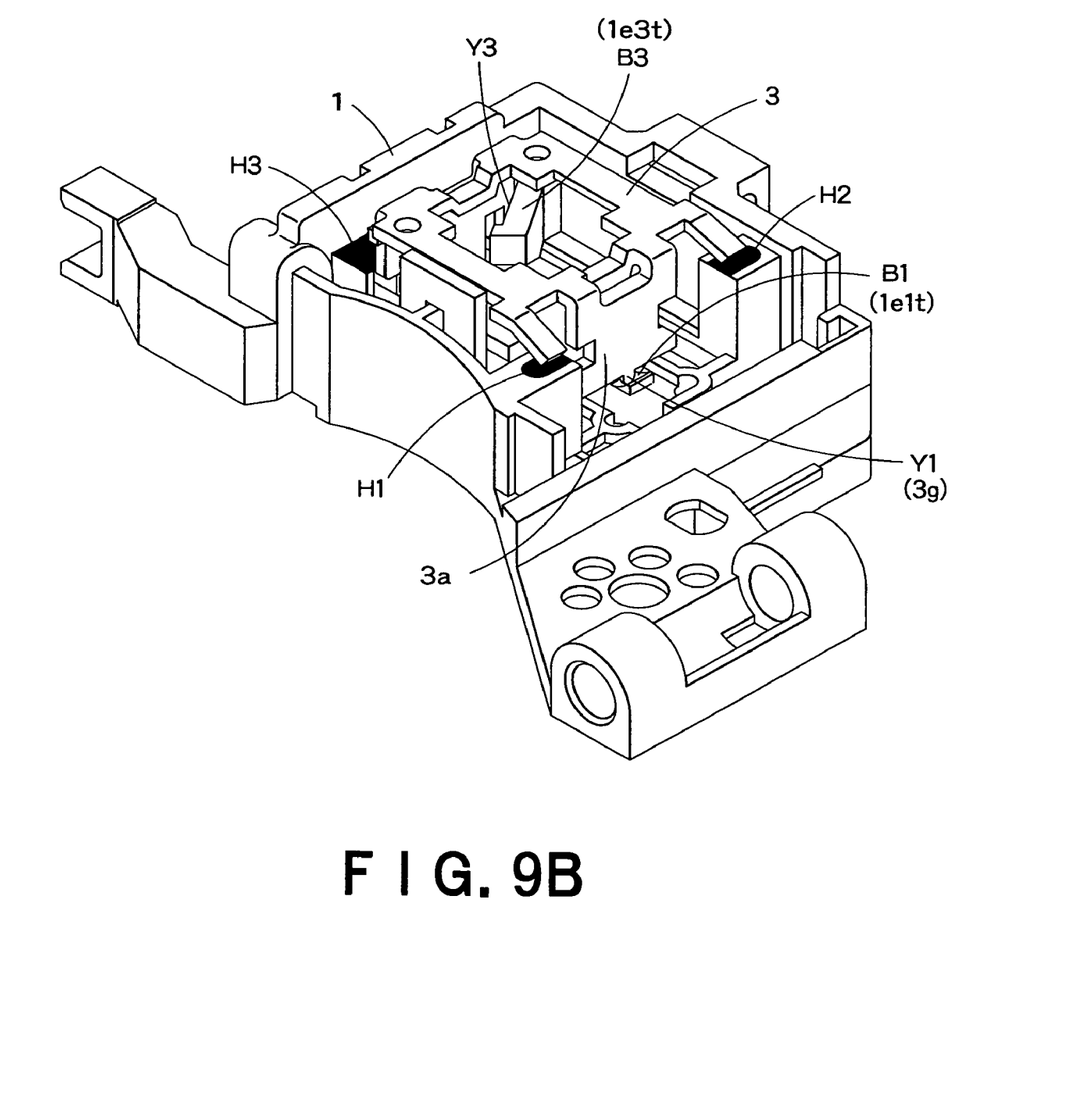
FIG. 9B shows another perspective view of the optical base and the yoke at different angles when the actuator (not shown in FIG. 9B) is mounted on the optical base, in the embodiment of the optical pickup according to the present invention.

Shown in FIGS. 9A and 9B are the optical base 1 and the yoke 3 at different angles when the actuator 2 is mounted on the optical base 1. The actuator 2 is not shown in FIGS. 9A and 9B for the yoke 3 to be clearly shown.

Figure 10:
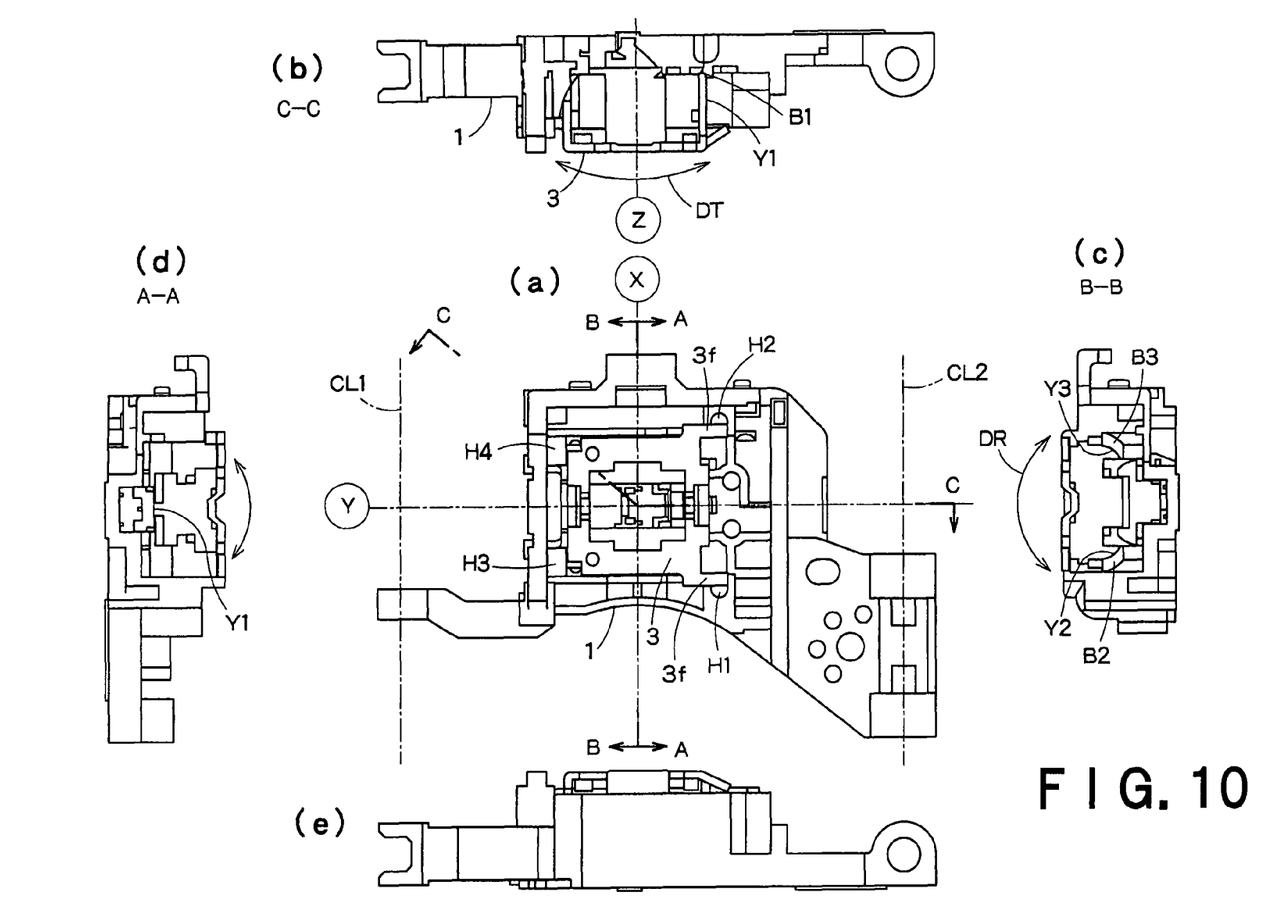
FIG. 10 shows the optical base and the yoke in the same situation as FIGS. 9A and 9B, with five views in which (a), (b), (c), (d), and (e) are a plan view, a front view, a left side view, a right side view, and a rear view, respectively, in the embodiment of the optical pickup according to the present invention.

Also shown in FIG. 10 are the optical base 1 and the yoke 3 in the same situation as FIGS. 9A and 9B, with five views in which (a), (b), (c), (d), and (e) are a plan view, a front view, a left side view, a right side view, and a rear view, respectively.

Illustrated in FIG. 9A is that the yoke sliding sections Y1 and Y2 are having contact with the base sliding sections B1 and B2, respectively. Illustrated in FIG. 9B is that the yoke sliding sections Y1 and Y3 are having contact with the base sliding sections B1 and B3, respectively.

The base sliding sections B1, B2, and B3 are the surface sections 1e1t, 1e2t, and 1e3t, respectively, formed as part of a spherical surface with the center CT, as described with reference to FIGS. 4 and 5. The yoke sliding sections Y1 to Y3 are the curved corners R1 to R6 with a curved surface, as described with reference to FIGS. 7 and 8.

Therefore, the base sliding sections B1 to B3 and the yoke sliding sections Y1 to Y3 are made to have contact with each other at three points in almost point contact. The point contact allows the yoke 3 to be slidable with respect to the optical base 1 within a zone in which the base sliding sections B1 to B3 and the yoke sliding sections Y1 to Y3 can be made to have contact with each other, thus the yoke 3 can take any attitude.

It is the best to form the base sliding sections B1 to B3 as part of a perfect spherical surface, but, preferable to form them as part of an almost spherical surface.

Defined in FIG. 9A are: an axis X that passes the center CT of the curvature including the base sliding sections B1 to B3 and is parallel with the axes CL1 and CL2 which are also parallel with each other; an axis Y that passes the center CT, and is parallel with the optical disc Dc (FIG. 2) and orthogonal to the axes CL1 and CL2; and an axis Z that is orthogonal to the axes X and Y.

Under the definitions, the yoke 3 is slidable, with respect to the optical base 1, at least, in a radial direction DR about the axis Y and in a tangential direction DT. Practically, the yoke 3 is slidable, with respect to the optical base 1, in the radial and tangential directions DR and DT of the actuator 2 due to the fact that the yoke 3 is integrally attached to the actuator base 8.

The yoke slidable mechanism allows radial- and tangential-skew adjustments to the actuator 2.

Moreover, the base sliding sections B1 to B3, or the surface sections 1e1t, 1e2t, and 1e3t, respectively, are formed as being included in (or part of) a spherical surface with the radius R0 from the center CT, as described with respect to FIG. 5, to achieve an angle of at least about ±2 degrees about each axis shown in FIG. 9A.

Figure 11:
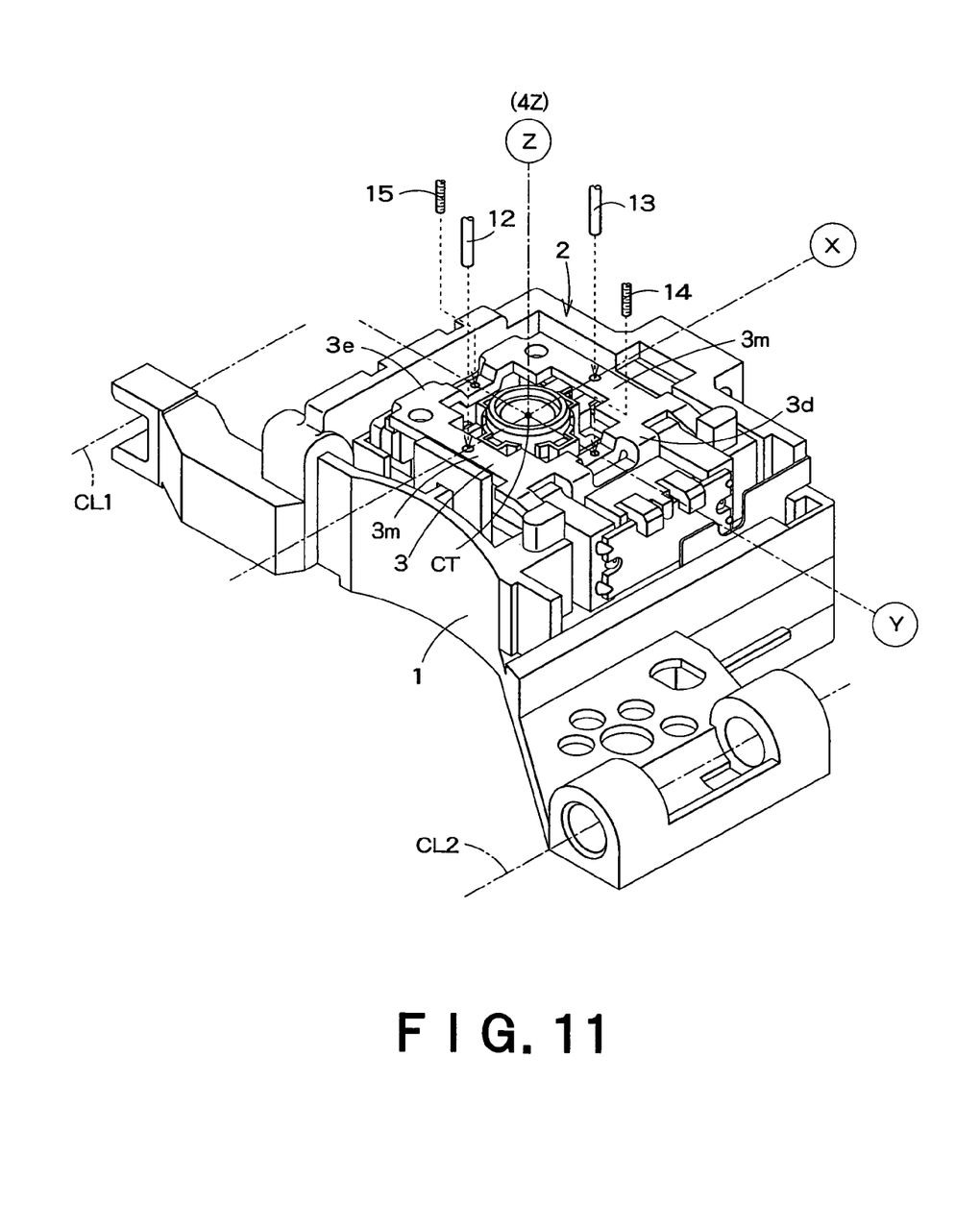
FIG. 11 shows a perspective view illustrating skew adjustments during the assembly procedure for the embodiment of the optical pickup according to the present invention.

Described next with respect to FIG. 11 are skew adjustments during the assembly procedure for the optical pickup 50.

Illustrated in FIG. 11 are the optical base 1 and the actuator 2 mounted on the optical base 1.

Firstly, the optical base 1 is set on a reference surface of a skew-adjustment tool, measurable with which is an inclination of an optical axis 4z of the objective lens 4 to the reference surface. And, the actuator 2 is mounted on the optical base 1.

The skew adjustments are made so that the inclination of the optical axis 4z of the objective lens 4 is set at a specific angle to the reference surface.

Four adjustment pins 12, 13, 14, and 15 are made to have a direct contact with the yoke 3 from the mounted actuator 2 side.

In detail, the adjustment pins 12 and 13 are pushed downwards while having contact with the frame sections 3m between which the axis Y is interposed whereas the adjustment pins 14 and 15 are pushed downwards while having contact with the frame sections 3d and 3e between which the axis X is interposed. Thus, a pair of the adjustment pins 12 and 13, and another pair of the adjustment pins 14 and 15 are pushed downwards while having contact with the yoke 3, with the objective lens 4 being interposed between the two pins of each pair.

The force to push the adjustment pins 12 to 15 downwards can be obtained as a repulsion force of a coil spring attached to the end of each pin to push the yoke 3.

Adjustments to the forces to push the adjustment pins 12 to 15 are made for the yoke 3, or the actuator 2, to take an attitude with the well-balanced forces so that the inclination of the optical axis 4z of the objective lens 4 is set at a specific angle to the reference surface.

Without such coil springs, the position of the tip of each adjustment pin may be adjusted. In detail, tip-position adjustments may be made to each of the pins 12 to 15 to the yoke 3, or the actuator 2, to take an attitude in accordance with the tip position of each pin so that the inclination of the optical axis 4z of the objective lens 4 is set at a specific angle to the reference surface.

The yoke 3 is soldered or bonded with an adhesive such as a light-cured adhesive to the optical base 1 when the optical axis 4z of the objective lens 4 is adjusted at a specific angle.

In detail, the yoke 3 is soldered or bonded to the optical base 1 at four positions H1, H2, H3, and H4 shown in (a) of FIG. 10. Fixed to the optical base 1 at the positions H3 and H4 are the protrusions 3f of the yoke 3. Each protrusion 3f sticks out from the base section 3k of the yoke 3, as shown in FIG. 6, so that an adhesive can be applied to the protrusion 3f with no leakage to the other sections.

Moreover, each protrusion 3f is formed into a specific shape so that it touches the optical base 1 when the actuator 2 is inclined too much for some reasons, thus preventing damages.

Such an inclination restriction mechanism may not be provided to the yoke 3 and the optical base 1 but the actuator base 8 and the optical base 1 so that both bases touch with each other when the actuator 2 is inclined too much.

In the optical pickup 50, the yoke 3 is situated in the opposite side of the optical base 1 with respect to the bobbin 6, or the yoke 3 and the bobbin 3 are arranged such that the optical base 1 is interposed therebetween, according to FIGS. 1 to 3.

Moreover, the opening 3c of the yoke 3 is made large enough so that the objective lens 4 can be exposed to the outside of the yoke 3, or the optical disc Dc side, as shown in FIG. 2.

With the opening 3c, the yoke 3 covers part of the actuator 2. In detail, the yoke 3 covers the movable components, such as, the bobbin 6, the suspension wires 7a to 7d, the focusing coil 9F, and the tracking coils 9Ta to 9Td so that the movable components cannot be exposed to the outside of the yoke 3. The yoke 3 may at least cover the suspension wires 7a to 7d that are movable but not so rigid, the focusing coil 9F, and the tracking coils 9Ta to 9Td.

With the configuration described above, the optical pickup 50 is protected against adverse effects of dust and foreign bodies, and damages during shipment.

Moreover, with the configuration described above, the optical pickup 50 does not require a protective cover for the movable components, which leads to a smaller number of components and assembly procedures, thus achieving cost down.

Furthermore, in the skew adjustments, the adjustment pins 12 to 15 are made to have a direct contact with the yoke 3 from the mounted actuator 2 side, as described with respect to FIG. 11, or the same side as mounting the actuator 2 (upside in FIG. 11), which allows easier adjustments with an easily-produced adjustment tool.

It is further understood by those skilled in the art that the foregoing description is a preferred embodiment of the disclosed device and that various changes and modifications may be made in the invention without departing from the spirit and scope thereof.

For example, the yoke sliding sections Y2 and Y3 may not be such curved corners R5 and R6, respectively, of the bent section 3b shown in (a) of FIG. 8, but a protrusion like the yoke sliding section Y1 (protrusion 3g) shown in FIG. 7.

As disclosed above in detail, the present invention provides an optical pickup having a movable unit protectable without a particular protective cover, equipped with a skew adjustment mechanism with a smaller number of components and a smaller number of adjustment processes, and a method of producing such an optical pickup with a smaller number of assembly processes.

What is claimed is:

1. An optical pickup comprising:
   an actuator having an objective lens; and
   an optical base on which the actuator is supported,
   wherein the actuator includes a yoke having an opening, a first straight section and an opposing second straight section, the opening being interposed between the first and second straight sections, the first and second straight sections having a first bent section and a second bent section, respectively, as an extension of each bent section, tne yoke being formed as coving the actuator with the first and second straight sections so that the objective lens is exposed through the opening without being obstructed by the optical base, the first bent section having a first contact section, the second bent section having a second contact section and a third contact section, and
   the optical base includes an ark-like support section to support the actuator,
   wherein the first contact section has a first protrusion at an end thereof and each of the second and third contact sections has a corner section or a second protrusion at an end of each contact section,
   whereby the optical base supports the actuator in such a way that the first protrusion and the corner section or the first and second protrusions are made to have contact with the ark-like support section.

2. The optical pickup according to claim 1, wherein at least either the first protrusion or the corner section has a curved surface to have contact with the ark-like support section.

3. The optical pickup according to claim 1, wherein at least either the first protrusion or the second protrusion has a curved surface to have contact with the ark-like support section.

4. An optical pickup comprising,
an actuator having an objective lens; and
an optical base on which the actuator is supported,
wherein the actuator includes a yoke having an opening, a first straight section and an opposing second straight section, the opening being interposed between the first and second straight sections, the first and second straight sections having a first bent section and a second bent section, respectively, as an extension of each bent section, the yoke being formed as coving the actuator with the first and second straight sections so that the objective lens is exposed through the opening without being obstructed by the optical base, the first bent section having a first contact section, the second bent section having a second contact section and a third contact section, and
the optical base includes an ark-like support section to support the actuator,
wherein the ark-like support section has three spherical surfaces as corresponding to the first, second and third contact sections, the spherical surfaces having an equal distance from a center of a sphere,
whereby the optical base supports the actuator in such a way that the first contact section of the first bent section and the second and third contact sections of the second bent section are made to have contact with the ark-like support section.

5. The optical pickup according to claim 4, wherein the center is a principal point of the objective lens.

6. An optical pickup comprising,
an actuator having an objective lens; and
an optical base on which the actuator is supported,
wherein the actuator includes a yoke having an opening, a first straight section and an opposing second straight section, the opening being interposed between the first and second straight sections, the first and second straight sections having a first bent section and a second bent section, respectively, as an extension of each bent section, the yoke being formed as coving the actuator with the first and second straight sections so that the objective lens is exposed through the opening without being obstructed by the optical base, the first bent section having a first contact section, the second bent section having a second contact section and a third contact section, and
the optical base includes an ark-like support section to support the actuator,
wherein a magnet is attached to each bent section as being covered by the bent section,
whereby the optical base supports the actuator in such a way that the first contact section of the first bent section and the second and third contact sections of the second bent section are made to have contact with the ark-like support section.

7. A method of producing an optical pickup including an optical base and an actuator having an actuator base, a movable unit, and a yoke, the movable unit having an objective lens and being supported by the actuator base as movable with respect to the actuator base, the method comprising the steps of:
forming the yoke as having a pair of opposing first and second straight sections with a first and a second bent section, respectively, as an extension thereof;
fixing the yoke on the actuator base so that the first and second straight sections cover the movable unit except for the objective lens;
mounting the actuator on the optical base so that the objective lens is exposed between the first and second straight sections without being obstructed by the optical base and so that the first and second bent sections only have contact with the optical base in order for the actuator to take an attitude with respect to the optical base;
pushing each straight section with at least one adjustment pin; and
adjusting a force to push the adjustment pin or a tip position of the adjustment pin to change the attitude of the actuator with respect to the optical base, thus adjusting an inclination of an optical axis of the optical lens to the optical base.

8. The method of producing an optical pickup according to claim 7 further comprising the steps of:
providing the optical base with an ark-like support section to support the actuator; and
providing the first bent section with a protrusion at an end thereof and the second bent section with a pair of corner sections or protrusions at an end of thereof,
wherein the actuator is mounted on the optical base by making the protrusion of the first bent section and the pair of the corner sections or the protrusions of the second bent section have contact with the ark-like support section.

9. The method of producing an optical pickup according to claim 8 further comprising the step of forming at least either the protrusion of the first bent section or each of the pair of the corner sections of the second bent section as having a curved surface to have contact with the ark-like support section.

10. The method of producing an optical pickup according to claim 8 further comprising the step of forming at least either the protrusion of the first bent section or each of the pair of the protrusions of the second bent section as having a curved surface to have contact with the ark-like support section.

11. The method of producing an optical pickup according to claim 8 further comprising the step of forming the ark-like support section as having three spherical surfaces as corresponding to the protrusion of the first bent section and the pair of the corner sections of the second bent section, the spherical surfaces having an equal distance from a center of a sphere.

12. The method of producing an optical pickup according to claim 8 further comprising the step of forming the ark-like support section as having three spherical surfaces as corresponding to the protrusion of the first bent section and the pair of the protrusions of the second bent section, the spherical surfaces having an equal distance from a center of a sphere.

13. The method of producing an optical pickup according to claim 11, wherein the three spherical surfaces are provided so that the center becomes a principal point of the objective lens.

* * * * *